Aug. 3, 1937.   R. C. DAHLINGER   2,088,841
AUTOMOTIVE VEHICLE STABILIZER
Filed Feb. 7, 1935
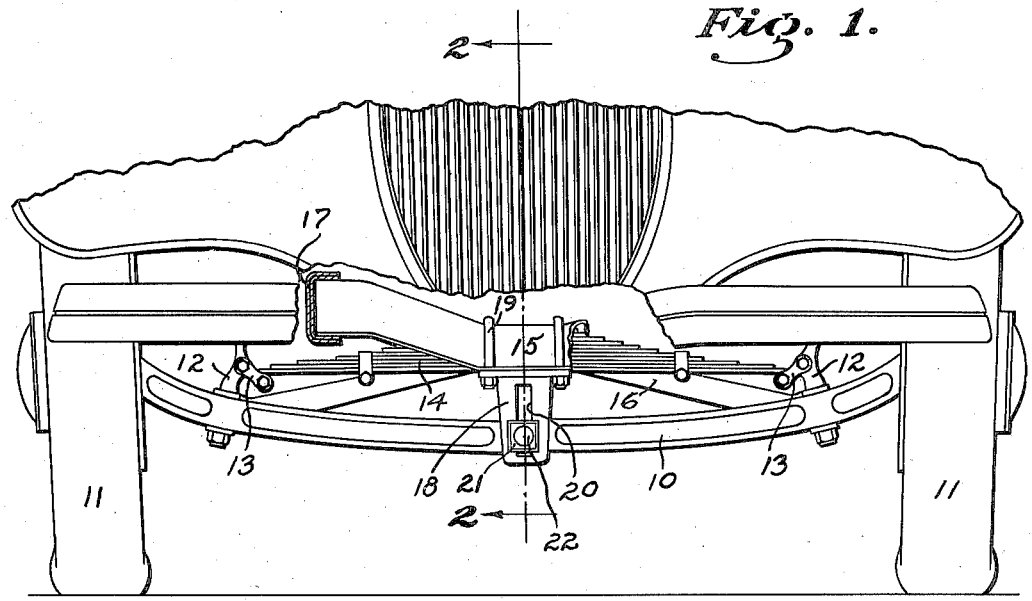
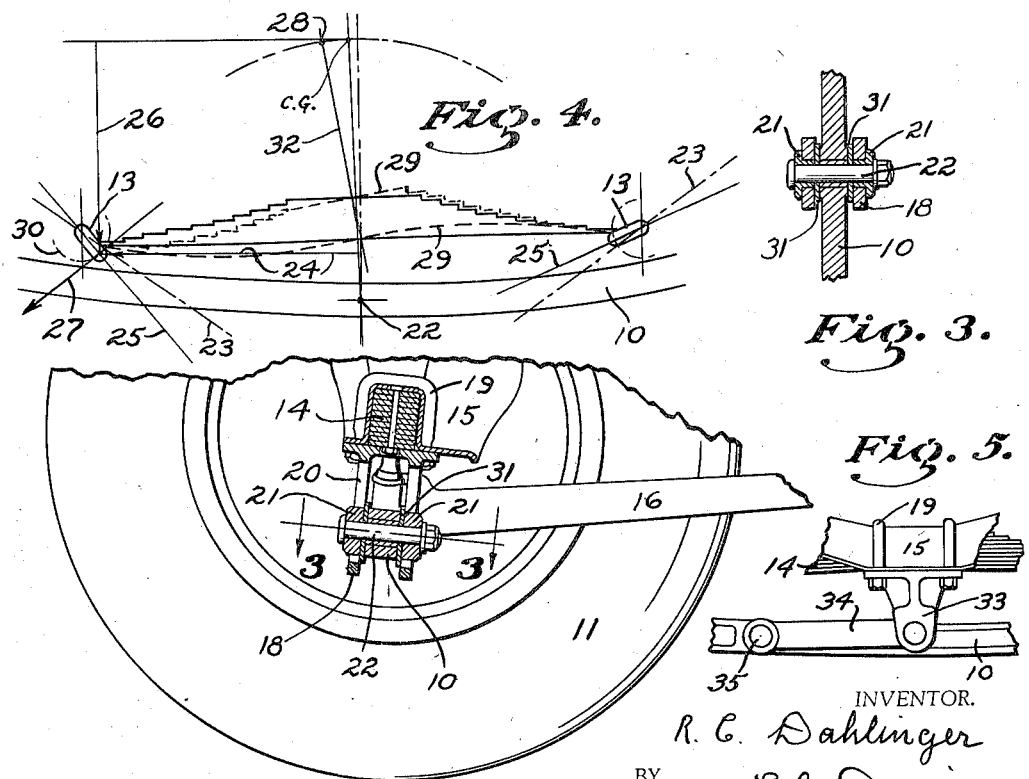
INVENTOR.
R. C. Dahlinger
BY
ATTORNEY.

Patented Aug. 3, 1937

2,088,841

UNITED STATES PATENT OFFICE 2,088,841

AUTOMOTIVE VEHICLE STABILIZER

Raymond Carl Dahlinger, Dearborn, Mich., assignor to Ford Motor Company, Dearborn, Mich., a corporation of Delaware Application February 7, 1935, Serial No. 5,445

1 Claim. (Cl. 267—66)

The object of my invention is to provide a stabilizer for automobiles by means of which the side sway of the vehicle is reduced without increasing the resistance of the vehicle springs to vertical road shocks.

A further object of my invention is to provide an automobile having a transverse spring construction wherein the resistance to side sway is materially greater than is ordinarily associated with such spring construction.

Still a further object of my invention is to provide a stabilizer which may be conveniently incorporated in existing automobiles without materially altering the car.

My construction briefly comprises a front axle having the vehicle frame supported thereon by means of a transverse spring. The vehicle frame is permitted or forced to oscillate around a longitudinal axis which passes through the center of the front axle; however, unrestricted vertical reciprocation of the frame is permitted. The effect of this construction is to eliminate the horizontal component of the resultant force which causes side sway of the car.

With these and other objects in view, my invention consists in the arrangement, construction and combination of the various parts of my improved device, as described in the specification, claimed in my claim, and illustrated in the accompanying drawing, in which:

Figure 1 is a front fragmentary view of a vehicle having my improved spring construction incorporated therein, portions of the bumper and radiator grill being broken away to better illustrate the construction.

Figure 2 is a sectional view, taken on the line 2—2 of Figure 1.

Figure 3 is a sectional view, taken on the line 3—3 of Figure 2.

Figure 4 is a diagrammatic view, illustrating the various forces imposed upon the front spring and axle, showing in particular how the side sway is reduced in my improved construction.

Figure 5 is a plan view of an alternate construction.

Referring to the accompanying drawing, I have used the reference numeral 10 to indicate the front axle of a vehicle, this axle having wheels 11 rotatably and steerably mounted upon its respective ends. Spaced inwardly from the ends of the axle 10, I have provided a pair of spring perches 12, each of these spring perches having a spring shackle 13 pivotally mounted thereon so as to swing in an arc, as shown by dotted lines 30. A multiple leaf spring 14 has its respective ends secured to the free ends of the shackles 13, while the middle portion of the spring 14 is secured to a front cross member 15 which is associated with a frame 17 of the vehicle. A pair of radius rods 16 have their forward ends secured to the axle 10 adjacent to the spring perches 12, the rear ends of these radius rods being secured together. The joined ends of the radius rods are universally mounted to the center cross member of the frame of the vehicle so that longitudinal movement of the axle 10 relative to the frame is prevented. Vertical movement of the frame relative to the axle is resisted solely by the spring 14.

It will be noted from the drawing that a U-shaped bracket 18 is clamped to the underside of the frame cross member 15 by means of a pair of U-bolts 19 and that the bracket 18 extends downwardly so as to straddle the center portion of the front axle 10. The cross member, front spring, and bracket are thus fixedly secured together. Both arms of the bracket 18 are provided with vertically extending slots 20 therein and a pair of shoes 21 are arranged to reciprocate therein. Each of the shoes 21 is provided with a central opening therein through which a pin 22 extends, this pin projecting through an opening in the center portion of the axle 10 in which it is pivotally mounted. Suitable thrust washers 31 are provided on each side of the axle 10 in position around the pin 22. Thus, in the normal operation of the vehicle, the front portion of the vehicle is allowed to reciprocate vertically relative to the axle 10; however, side sway of the frame must be accomplished by rocking the frame around the pin 22.

Referring to Figure 4, I have shown diagrammatically the various forces which are applied on the spring and axle as the vehicle rounds a curve. The spring shackles are normally placed at an angle of about 45 degrees with the vertical as shown by dotted lines 23. This is to prevent the spring from rocking excessively laterally, due to side thrust, as would occur if the shackles were placed vertically. When the vehicle is being directed around a curve, it attempts to follow a tangential line through the center of gravity, which tangential movement tends to shift the front spring bodily towards the outside end of the front axle. This force is represented in Figure 4 by line 24. Such movement of the spring is permitted for the reason that the spring shackles swing to the positions shown by solid lines 25.

The center of gravity of the car is in this case located above the frame in a position aligned with the point marked "C. G." in the drawing. If the center of gravity were located at the same height as the spring shackles, the force represented by line 24 would be the only reaction upon the spring shackles due to side thrust, and would be completely resisted by the right hand shackle when it approached its horizontal position. It should be noted that this shackle never becomes truly horizontal because the vertical load of the vehicle is always divided in equal proportions between the two shackles, neither of them at any time resisting more than half the weight of the car. However, due to the fact that the center of gravity is invariably above the spring shackles, a vertical downward force is applied to the shackle on the outside of the curve, which force is added to the vertical load and is represented by line 26. A vertical upward force in equal amount is subtracted from the vertical load on the other shackle. The resultant force upon the outside spring shackle is thereby applied in the direction of arrow 27. For this reason the outside half of the spring 14 deflects or bends downwardly while the inside half deflects upwardly, the spring assuming the position shown by dotted lines 29. The center of the spring in this case twists so that the center of gravity shifts to the position shown by point 28. The center line of the car thereby sways to the position shown by line 32. This causes the side sway inherent in the conventional car.

Referring now to the applicant's device, it will be apparent that the center of gravity is permitted to swing laterally only around the pin 22. The cross member 15 is fixed to the center of the spring and to the bracket 18 so that the lateral swinging of the car swings the center of the spring bodily around the pin 22. This movement is resisted by the inside spring shackle which places the inside half of the spring under increasing tension as it nears its horizontal position. The center of the spring cannot twist to the position, shown by dotted lines 29, but may swing only to the position shown by solid lines in Figure 4. Thus, a maximum side thrust or one sufficient to overturn the car can only extend the inside shackle to its horizontal position so that the center of gravity is held from further lateral movement.

This effect cannot be produced in the conventional spring suspension except by increasing the stiffness of the whole spring. While such an increase in stiffness will resist side sway of the body, it will not limit same, as will the applicant's device. Further, increasing the stiffness of the spring makes a harder riding car; whereas, the applicant's method of preventing side sway is independent of the stiffness of the spring and consequently with his device the spring may be designed to resist vertical loads only.

Referring to Figure 5, I have shown an alternate construction wherein no sliding joints are provided. In this installation the cross member 15 and the spring 14 are both located in front of the axle 10. A bracket 33 is secured to the underside of the cross member and extends downwardly in front of the axle. The lower end of the bracket 33 forms a clevis in which one end of an arm 34 is pivotally mounted, the other end of this arm extending laterally where it is pivotally secured to a pin 35 which projects forwardly from the axle 10. Thus, the bracket 33 is guided to oscillate around the pin 35 along a substantially vertical path. True vertical reciprocation is not a requisite, as the spring shackles 13 will compensate for the slight lateral movement of the bracket, due to its oscillation. Side thrust upon the vehicle's center of gravity produces either a tension or compression in the arm 34 the same as is produced upon the pin 22.

The advantage of this alternate construction is that both of the joints may be conveniently lubricated.

Among the many advantages arising from the use of my improved device, it may be well to mention that a spring suspension of a very low rate of oscillation may be provided and still the side sway heretofore unavoidable with such spring may be prevented.

Still further, my improved device is relatively inexpensive and inasmuch as the part may readily be constructed of a very rugged character very little trouble in service need be expected.

Still a further advantage of my device is that the suspension is built around the well known solid axle and transverse spring suspension which has proven itself in millions of vehicles to be an exceptionally safe and reliable construction.

Some changes may be made in the arrangement, construction and combination of the various parts of my device without departing from the spirit of my invention, and it is my intention to cover by my claim such changes as may reasonably be included within the scope thereof.

I claim as my invention:

A vehicle spring suspension comprising, an axle having a road wheel rotatably mounted at each end thereof, a pair of spring perches secured to said axle at points spaced inwardly from said wheels, said spring perches each having a spring shackle secured thereto, a transverse spring pivotally suspended between the free ends of said spring shackles, a transverse cross member forming a part of the frame of the vehicle, said cross member being positioned a substantial distance above said axle and substantially aligned therewith, the center portion of said spring being fixedly secured to the center portion of said cross member, a bracket fixed to the center portion of said spring so as to extend downwardly to position where its lower end is substantially aligned horizontally with the center portion of said axle, a fulcrum pin fixed to said axle adjacent to one end thereof, a second fulcrum pin fixed to the lower end of said bracket, an arm pivotally connecting said pins so as to lie in the horizontal plane of said axle, said arm limiting the movement of the lower end of said bracket to vertical oscillation around said first mentioned pin, said second mentioned fulcrum pin being positioned sufficiently below said cross member that a force tending to rock said cross member in one direction will compress said arm and tension the adjacent half of said spring so as to positively prevent further rocking of the cross member relative to the vehicle axle irrespective of the resilience of said spring.

RAYMOND DAHLINGER.